US006459040B2

(12) United States Patent
Teunisse et al.

(10) Patent No.: US 6,459,040 B2
(45) Date of Patent: Oct. 1, 2002

(54) HOUSING AND CABLE WITH ELECTROMAGNETIC INTERFERENCE SHIELDING

(75) Inventors: Antonius G. C. Teunisse; Patrick Van Beek; Petrus J. M. Fransen, all of Oss (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/730,431

(22) Filed: Dec. 5, 2000

(30) Foreign Application Priority Data

Dec. 6, 1999 (EP) ........................................... 99204123

(51) Int. Cl.[7] ................................................ H02G 3/18

(52) U.S. Cl. ......................... 174/65 R; 174/48; 174/50; 174/51; 220/402; 248/906

(58) Field of Search ............................. 174/74 R, 73.1, 174/50, 48, 17 R, 51, 65 R, 34, 35 R, 35 C; 220/3.6, 5.8, 4.02; 248/906; 439/98, 455, 610

(56) References Cited

U.S. PATENT DOCUMENTS

| | | | | | |
|---|---|---|---|---|---|
| 4,591,658 | A | * | 5/1986 | Bauer et al. | 174/65 R |
| 5,216,203 | A | * | 6/1993 | Gower | 174/152 G X |
| 5,403,976 | A | * | 4/1995 | Maurice | 174/65 R |
| 5,663,525 | A | * | 9/1997 | Newman | 174/50 |
| 5,831,815 | A | | 11/1998 | Miller et al. | 3361/679 |

FOREIGN PATENT DOCUMENTS

| | | | |
|---|---|---|---|
| DE | 29702513 | 5/1997 | H05K/5/04 |
| GB | 2181607 | 4/1987 | H01R/4/64 |

* cited by examiner

*Primary Examiner*—Dean A. Reichard
*Assistant Examiner*—Dhiru R Patel

(57) ABSTRACT

A housing has an electric cable passing through an electromagnetic interference shielding wall. The wall has an edge and a recess bordering the edge. When the cable is introduced into the recess the cable is electrically connected to the shielding through a contact in or adjacent the recess, and a fastening element on the cable mates with a receiving element on the wall adjacent the recess. The fastening and receiving elements cooperate to absorb any mechanical pull loads on the cable without disturbing the electrical connection to the shielding.

20 Claims, 2 Drawing Sheets

HOUSING AND CABLE WITH ELECTROMAGNETIC INTERFERENCE SHIELDING

BACKGROUND OF THE INVENTION

The invention relates to a system comprising a housing and an electric cable, in which system:

- the housing comprises an electromagnetic interference (hereinafter "EMC") shielding wall with an edge,
- a recess being provided at the edge in the wall, and
- the wall is provided with contact means for electrically contacting the electric cable and the wall at least adjacent the recess.

The invention also relates to a housing and to an electric cable.

Such a system is known from DE 297 02 513 U1. In the known system, the contact means are at the same time means by which a fastening of the electric cable to the housing is realized. The contact means are for this purpose constructed as a clamping strap. A disadvantage of the known system is that the existence of a mechanical load on the known fastening at the same time implies that the electrical contacting is fully and directly mechanically loaded. This involves a comparatively high risk of the contacting between the electric cable and the wall being broken. Another disadvantage of the known system is that the creation of the fastening between the electric cable and the housing by means of a clamping strap is a comparatively labor-intensive and difficult process.

The contact means of the known system require comparatively much space. This is disadvantageous for an application of this system in a comparatively small chamber. Resilient tags are provided in the known system for counteracting this disadvantage to a certain extent. However, this leads to another disadvantage of the system, i.e. that the EMC shielding wall provides a less effective EMC shielding.

It is important in a number of applications that the EMC shielding wall should be safe to touch. That means that electrically conducting parts of the wall and the contact means cannot be inadvertently touched. The known system has the disadvantage that the risk of inadvertent touching is comparatively great because the contact means project comparatively far outward in the known system.

BRIEF SUMMARY OF THE INVENTION

The invention has for its object to counteract the above disadvantages. According to the invention, this object is achieved in that a system of the kind described in the opening paragraph is characterized in that the electric cable comprises a fastening element, and in that a receiving element mating with the fastening element is provided on the wall, shifted relative to the recess along an axis perpendicular to the wall, into which receiving element the cable and the fastening element can be introduced from a transverse direction.

In the system according to the invention, the functions of electrically contacting the electric cable and of accommodating a mechanical (tensile) load have been partly separated. The separation in part of said functions has the advantage that the full and direct mechanical load on the electrical contacting is absent in the case of a mechanical load on the electric cable. The transverse accommodation of the fastening element counteracts an axial displacement of the cable relative to the wall, which might occur as a result of the mechanical load, in a simple manner. The mechanical load is partly accommodated by the receiving element and the fastening element. The recess may be chosen such that the cable introduced therein is held with clamping force. In that case, not only the receiving element and the fastening element, but also the recess will absorb any mechanical load which will be present. Since the mechanical load is shared among the recess, the receiving element, and the fastening element, the risk of breaking of the electrical contact in the case of mechanical loads is comparatively small.

Since the receiving element and the fastening element have corresponding shapes, the system is simple to assemble. In addition, the recess can be covered at least substantially entirely by the fastening element. This gives the system the advantage that an improved shielding of components present in the housing is obtained as compared with the known system, for example against dirt particles. The contacting can be screened off by the fastening against inadvertent touching because the contacting is provided in a direction which is axially shifted with respect to the fastening. The advantage of this is that the system has become safer to touch.

Finally, the system in which the electrical contacting and accommodation of the mechanical loads have been realized in the manner described has the advantage that the system is comparatively compact.

In an embodiment of the system, the receiving element is an integral portion of the wall. The receiving element and the wall may thus be manufactured from one piece and in one and the same operation, for example by injection molding. Preferably, the receiving element comprises a second wall which is at least substantially parallel to the wall and is situated at least at the area of the recess, and a space between the wall and said second wall. The wall is thus a double wall at the area of the recess. The two walls have respective recesses which are axially displaced relative to one another. A compact system for cord anchorage and electrical contacting is achieved in a simple manner in that the fastening element is given a shape by which it can be accommodated in the space and hooks itself behind the second wall.

In an alternative embodiment of the system, the recess has an inner surface, while the contact means are chosen from the group formed by an electrically conducting resilient portion at the inner surface or axially displaced relative to the inner surface on the wall, an electrically conducting cutting contact at the inner surface or axially displaced relative to the inner surface on the wall, and an electrically conducting layer on the inner surface. The system has become even safer to touch because the contacting is concealed in or behind the wall. In addition, a yet more compact system is achieved thereby.

In a favorable embodiment of the system, the recess has a tapering shape in a transverse direction from the edge. A cable introduced into the tapering recess will be clamped therein automatically. No additional components are required for fastening the cable to the housing in this case. Provided the electric cable remains pressed home under a permanent pressure in the direction in which the recess tapers, for example by means of a lid which closes off the recess at least partly, the cable will automatically remain clamped in in the recess. If the contact means in addition comprise a cutting contact, they will cut themselves into the electric cable while the latter is being introduced into the recess. The electrical contacting may thus be achieved without separate operations being necessary for it. Because of the permanent clamping force on the cable there is an enhanced risk on a permanent deformation of the cable and, on a result, there is a risk on an impaired contracting during lifetime. If the electric cable has a sheath for the purpose of contacting the contact means, a metal bush may be provided directly below the sheath at the area where the cable is passed through the recess so as to counteract permanent deformation of the cable. The risk of an impaired contacting between the electric cable and the housing in the course of product life is improved thereby.

In a preferred embodiment of the system, the fastening element is an integral portion of the electric cable. The cable and the fastening element may thus be readily manufactured in one and the same operation, for example through injection molding. The system can thus be manufactured comparatively inexpensively.

In another favorable embodiment of the system, the fastening element has a U-shaped cross-section in transverse direction. This U-shaped cross-section counteracts a mechanical loading of the contacting or of portions of the electric cable present inside the housing owing to, for example, torsion of the cable relative to the housing. The risk of the cable becoming detached, with the resulting short-circuit in the system, is reduced thereby. The system has thus become more robust and safer.

An embodiment of the system is characterized in that the fastening element comprises metal and/or is provided with an electrically conducting layer. Such a fastening system ensures that comparatively small EMC leaks in the EMC shielding wall adjacent the recess are eliminated. It is achieved in a very simple manner thereby that the EMC shielding by the wall is yet further improved.

The EMC shielding wall may in its entirety consist of metal, for example of cast aluminum, but it may alternatively be manufactured from a synthetic resin, for example PVC or polyethylene, which is provided with an electrically conducting layer, for example of aluminum or copper. The layer may be present outside or inside the housing. If the layer is provided inside the housing, the housing is suitable for an application in which it should be safe to touch.

The electric cable may have several electrically conducting core wires of which at least one is designed for the electrical contacting with the wall. Alternatively, the cable may have a core wire which is surrounded by an electrically conducting sheath which is not in electrical connection with the core wire for the purpose of EMC shielding, for example a coaxial cable.

BRIEF DESCRIPTION OF SEVERAL VIEWS OF THE DRAWING

An embodiment of the system according to the invention is shown diagrammatically in the drawing, in which.

DETAILED DESCRIPTION OF THE INVENTION

Figure 1:
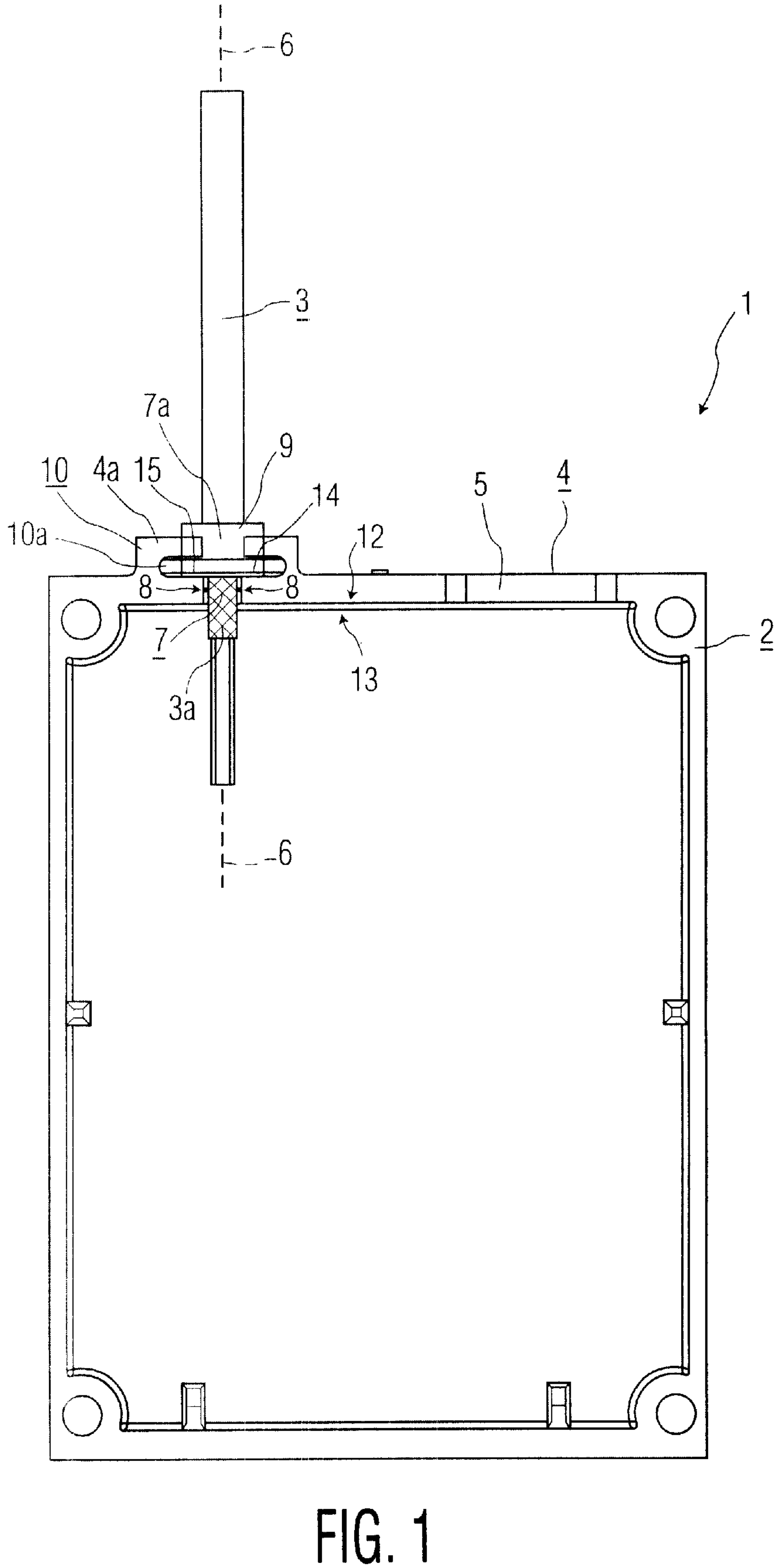
FIG. 1 shows a system in plan view.

FIG. 1 shows a system 1 comprising a housing 2 and an electric cable 3, which housing 2 comprises an EMC shielding wall 4 with an edge 5. The electric cable 3 is a coax cable which has an EMC shielding sheath 3a. The wall 4 is provided at a side 12 thereof with an electrically conducting layer 13. A direction transverse to the wall 4 defines an axis 6 which extends through a recess 7 provided in the wall 4, which recess 7 is provided at the edge 5 in the wall 4. The wall 4 is provided with contact means 8 in the recess 7. The electric cable 3 has a fastening element 9 which is introduced into a receiving element 10 which mates with the fastening element 9. The receiving element 10 is provided on the wall 4 so as to be axially displaced with respect to the recess 7. The receiving element 10 is formed by a second wall 4*a* at least at the area of the recess 7 parallel to the wall 4 and a space 10*a* between the wall 4 and the second wall 4*a* . The two walls 4, 4*a* have respective recesses 7, 7*a* which are axially spaced apart from one another. The fastening element 9 is an integral portion of the electric cable 3 and is provided with an electrically conducting layer 15 on a side 14 which faces the wall 4. The cable 3 and the fastening element 9 can be introduced into the receiving element 10 from a transverse direction. In the embodiment of the system 1 as described here, contacting between the sheath 3*a* and the conducting layer 13 of the wall 4 is realized in a simple manner. A partial cord anchorage of the electric cable 3 is realized at least substantially in the same location through the cooperation of the fastening element 9 with the receiving element 10. The system 1 provides a satisfactory EMC shielding which is safe to touch.

Figure 2:
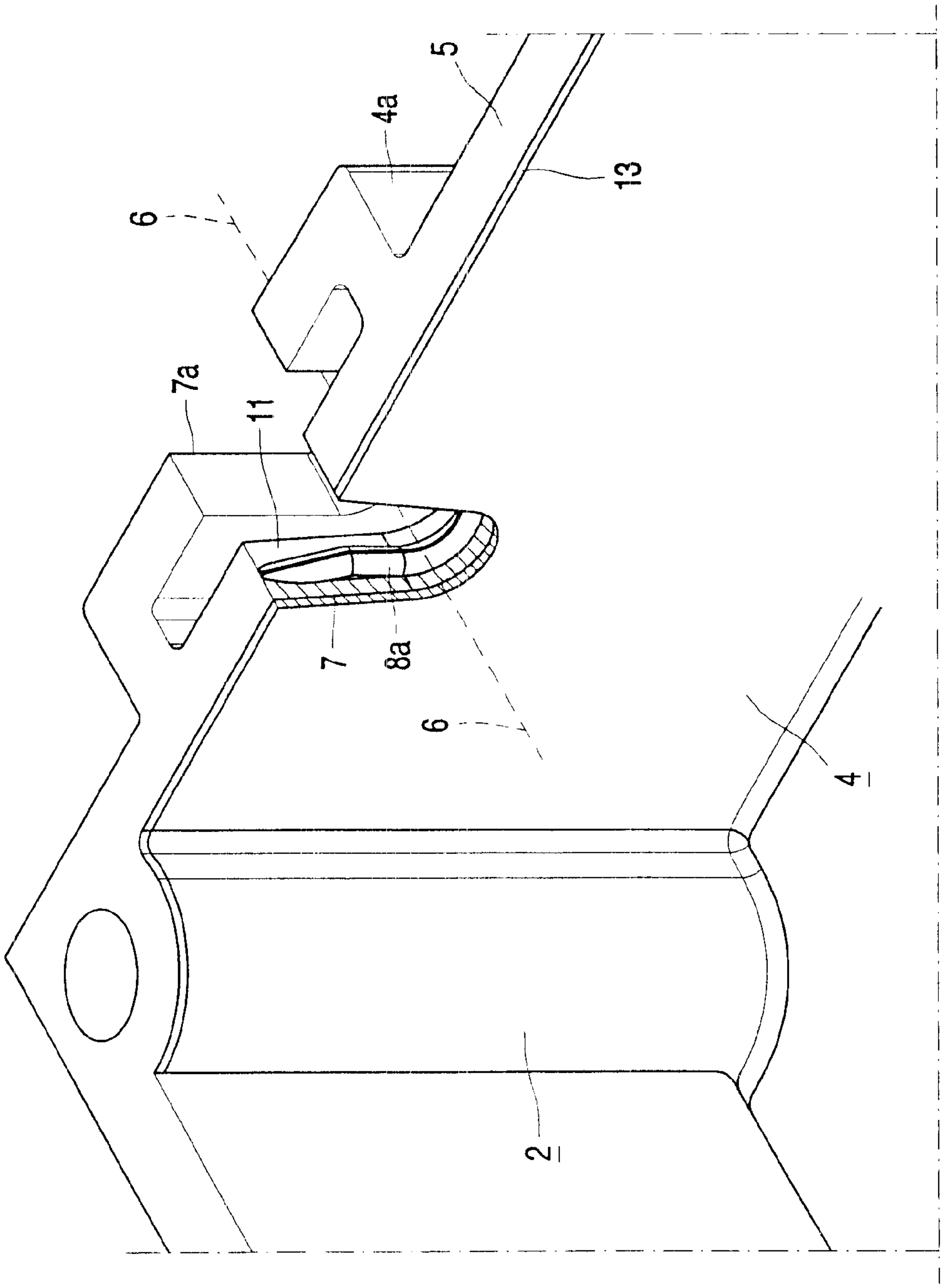
FIG. 2 shows a detail of the system of FIG. 1 in perspective view.

FIG. 2 shows a detail of the housing 2 of the system of FIG. 1. It is apparent from FIG. 2 that the recess 7 in the wall 4 has a somewhat tapering shape as seen from the edge 5 in a direction perpendicular to the axis 6, and that the recess 7*a* in the second wall 4*a* has a U-shaped cross-section. The recess 7 has an inner surface 11 in which electrically conducting resilient parts 8*a* have been provided as the contact means.

What is claimed is:

1. A system (1) comprising a housing (2) and an electric cable (3) extending outwardly from the housing (2), in which system:

the housing (2) comprises an electromagnetic interference shielding wall (4) with an edge (5), a recess (7) through which the cable passes is provided at the edge (5) in the wall (4), and the wall (4) is provided with contact means (9) for electrically contacting the electric cable (3) and the wall (4) at a location at least adjacent the recess (7), characterized in that the electric cable (3) comprises a fastening element (9), and in tat a receiving element (10) mating with the fastening element (9) is provided on the wall (4), axially displaced relative to the recess (7) along an axis (6) perpendicular to the wall (4), into which receiving element (10) the cable (3) and the fastening element (9) can be introduced by relative movement in a direction transverse to said axis.

2. A system (1) as claimed in claim 1, characterized in that the receiving element (10) is an integral portion of the wall (4).

3. A system (1) as claimed in claim 2, characterized in that the receiving element (10) comprises a second wall **(4*a*) which is at least substantially parallel to the wall (4) and is situated at least at the area of the recess (7), and a space (10*a*) between the wall (4) and said second wall (4*a*)**.

4. A system (1) as claimed in claim 1, characterized in that the recess (7) has an inner surface (11), while the contact means (8) are chosen from the group formed by an electrically conducting resilient portion at the inner surface (11) or axially displaced relative to the inner surface (11) on the wall (4), an electrically conducting cutting contact at the inner surface (11) or axially displaced relative to the inner surface (11) on the wall (4), and an electrically conducting layer on the inner surface (11).

5. A system as claimed in claim 1, characterized in that the recess (7) has a tapering shape, viewed in a direction parallel to said axis.

6. A system (1) as claimed in claim 1, in which the housing (2) is provided with a cover, characterized in that said cover closes off the recess (7) at least partly.

7. A system (1) as claimed in claim 1, characterized in that the fastening element (9) is an integral portion of the electric cable (3).

8. A system as claimed in claim 1, characterized in that the fasting element (9) has a U-shaped cross-section viewed in a direction parallel to said axis.

9. A system as claimed in claim 1, characterized in that the fastening element (9) is provided with an electrically conducting layer (15).

10. A system as claimed in claim 1, characterized in that the fastening element (9) comprises metal.

11. A system as claimed in claim 1, characterized in that the receiving clement is displaced axially from said location.

12. A system as claimed in claim 1, characterized in that the contact means is disposed in said recess.

13. A system as claimed in claim 12, characterized in that the recess (7) has an inner surface (11) extending in a direction substantially parallel to said axis, said contact means being disposed on said inner surface.

14. A housing for use with an electric cable extending outwardly from the housing, said housing comprising:

an electromagnetic interference shielding wall (4) having an edge (5), a recess in said wall (4) at said edge (5), said recess having an inner surface (11) defining an axis extending in a direction transverse to said wall, a receiving element (10) arranged for mating with a fastening element on an electric cable introduced into the recess in a direction parallel to said wall, and means, disposed on said inner surface, for electrically contacting the cable after introduction into the recess, said receiving element being spaced from said inner surface in a direction along said axis.

15. A housing as claimed in claim 14, characterized in that the means for electrically contacting are chosen from the group formed by an electrically conducting resilient portion on the inner surface (11), an electrically conducting cutting contact on the inner surface (11), and an electrically conducting layer on the inner sure (11).

16. A housing as claimed in claim 14, characterized in that the receiving element (10) comprises a second wall (4*a*) at least substantially parallel to the wall (4) and disposed at least at the area of the recess (7), said wall (4) and second wall (4*a*) defining a space (10*a*) therebetween.

17. A housing as claimed in claim 16, characterized in that the means for electrically contacting are chosen from the group formed by an electrically conducting resilient portion on the inner surface (11), an electrically conducting cutting contact on the inner surface (11), and an electrically conducting layer on the inner surface (11).

18. A cable for providing connections from outside a housing having an electromagnetic interference shielding wall to inside the housing, where the housing interference shielding wall has an edge and a recess extending through the wall from the edge, and the housing has a receiving element provided on the wall and spaced from the recess in a direction substantially perpendicular to the wall, and contact means disposed on an inner surface of the recess, said cable defining an axis and comprising:

a fastening element extending outwardly and substantially perpendicularly to said axis, arranged for mating with a receiving element upon introduction of the cable into the recess by relative movement in a direction substantially parallel to the wall, and an external surface spaced axially from the fastening element and exposed for electrically contacting said contact means upon said introduction of the cable.

19. A cable as claimed in claim 18, characterized in that the fastening element is arranged to mate with a second wall of the housing at least parallel to and spaced firm the housing wall, the housing wall and second wall defining a space therebetween.

20. A cable as claimed in claim 19, for use where the second wall has a fist surface bounding said space therebetween, and an outer surface, said fastening element being arranged to mate with said first surface and said outer surface upon said introduction of the cable.

* * * * *